INVENTORS
HARRY M. VALENTINE

April 7, 1970　　　H. M. VALENTINE　　　3,504,947
SERVICE AND EMERGENCY BRAKE CONTROL VALVE
Filed Oct. 3, 1968　　　　　　　　　　　　2 Sheets-Sheet 2

INVENTOR
HARRY M. VALENTINE

BY
Scrivener Parker Scrivener & Clarke
ATTORNEYS

United States Patent Office 3,504,947
Patented Apr. 7, 1970

3,504,947
SERVICE AND EMERGENCY BRAKE
CONTROL VALVE
Harry M. Valentine, Elyria, Ohio, assignor to Bendix-Westinghouse Automotive Air Brake Company, Elyria, Ohio, a corporation of Delaware
Filed Oct. 3, 1968, Ser. No. 764,753
Int. Cl. B60t 15/16
U.S. Cl. 303—13                          4 Claims

ABSTRACT OF THE DISCLOSURE

Tandem brake control valve means for operating a first, self lapping brake valve for controlling normal fluid pressure service brakes by movement of a brake pedal through a first range of movement and a second valve for effecting controlled graduated release of pressure from a release cavity of a pressure released spring applied brake by movement of the pedal in a brake applying direction greater than the first range of movement. Means are provided for preventing accidental release of pressure from the spring brakes so long as the source of normal service pressure is above a predetermined safe value.

This invention relates to fluid pressure braking systems incorporating spring applied emergency brakes and more particularly to a control valve for controlling both the application of the fluid pressure applied service braking and the spring applied emergency braking.

Spring applied brakes for emergency or parking use are well known and very briefly comprise a piston or the like which is urged in a brake setting direction by a heavy spring and is moved to and retained in a brake releasing position by the application of emergency fluid pressure onto the piston in opposition to the spring. The piston and its cylinder are usually arranged in tandem with a fluid pressure operated service brake chamber and the spring applied piston operates against the service diaphragm to apply the brakes when emergency pressure is released from the spring cylinder. Heretofore, in the event that an operator wished to apply the spring brake in an emergency situation, as, for example, upon loss of service pressure, it was necessary for him to operate a manual valve which would suddenly connect the fluid pressure release chamber of the spring brake to atmosphere while disconnecting the chamber from an emergency reservoir. Under these conditions, the spring brake is instantly and fully applied, often bringing a vehicle to a dangerously abrupt stop in high speed traffic causing accidents. It is the object of the present invention to provide means whereby the release of pressure from the spring brake release chamber can be controlled so as to effect a more gradual application of the spring brake.

More particularly, it is an object of the invention to provide in tandem with the usual pedal operated service brake valve, a valve for the spring brake arranged so that upon loss of service pressure the operator can make an increased pedal depression to effect a graduated opening of an exhaust valve releasing the pressure from the spring brake release chamber to atmosphere at a controlled rate determined by the degree of pedal depression.

Yet another object of the invention is to provide a valve which accomplishes the foregoing objects, yet is so constituted and arranged that the operator is prevented from simultaneously applying the service brakes and effecting release of the spring actuator whereby a doubled and possible dangerous force is exerted on the brake.

Other objects and their attendant advantages will become apparent as the following detailed description is read in conjunction with the accompanying drawings wherein.

Figure 1:
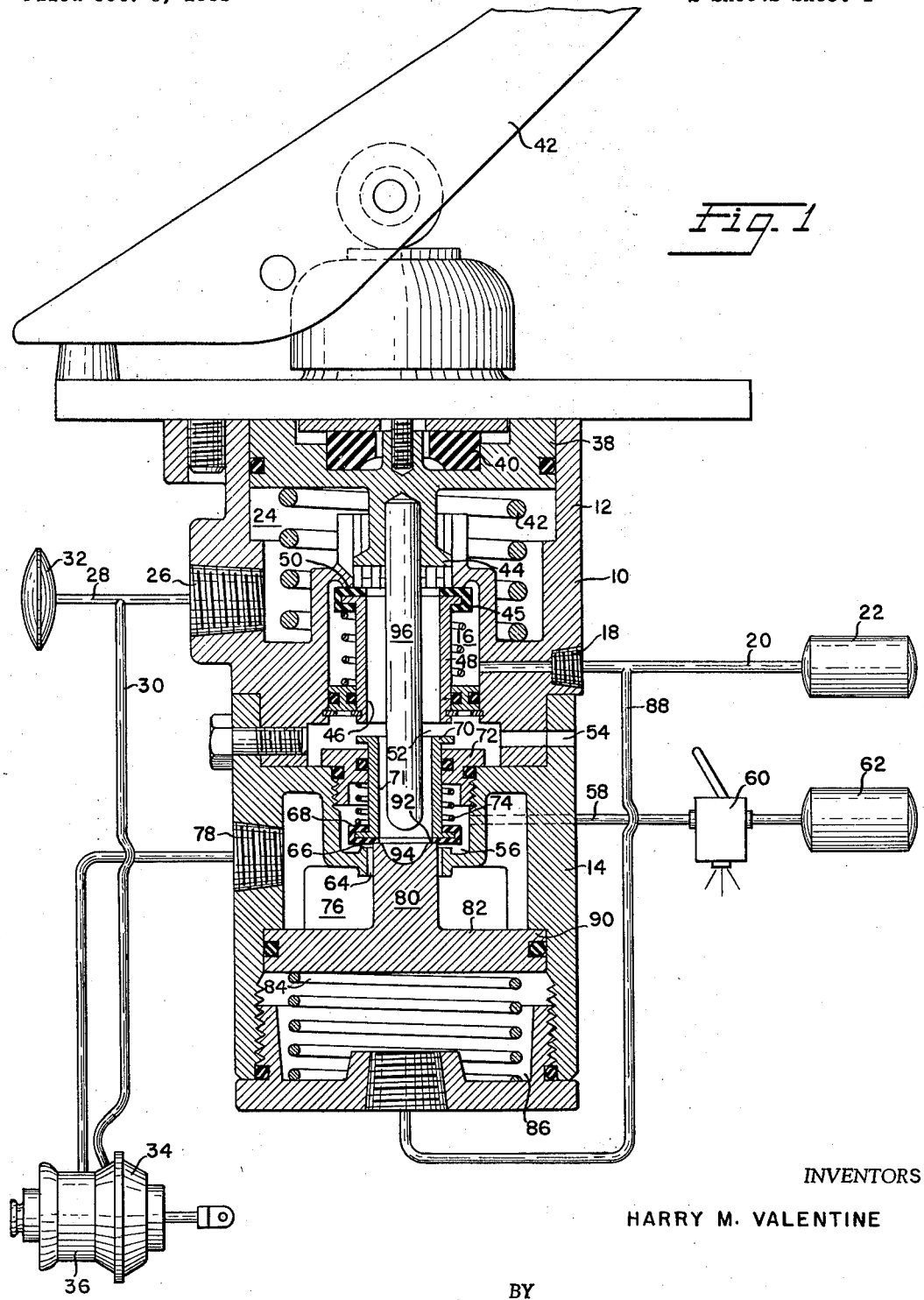
FIG. 1 is a vertical cross-sectional view showing a valve embodying the features of the invention in conjunction with a combined fluid pressure and spring actuated brake system.

Referring now to FIG. 1 the numeral 10 designates a valve body which includes an upper part 12 which is substantially conventional self-lapping pedal operated brake valve for controlling the service application of the brakes and a lower part 14 for controlling the spring applied brakes.

The service valve portion 12 includes an inlet chamber 16 connected by way of a port 18 and a conduit 20 with a service fluid pressure reservoir 22. A delivery chamber 24 in the valve part 12 is connected by way of a delivery port 26 and conduit 28, 30, with conventional service brake chambers 32, 34, the latter being equipped with a tandemly operated spring brake chamber 36 of conventional construction and including a brake applying spring (not shown) which operates in a brake applying direction against a fluid pressure piston or diaphragm and movable in response to fluid pressure exerted on the piston in opposition to the spring to retain the spring actuator in inactive or inoperative position.

The upper end of the delivery cavity 24 is closed by a graduating piston 38 having a central recess for the reception of a rubber graduating spring 40 which is compressed by actuation of a pedal 42 and exerts a downward force on the piston 38 against an opposing upward force of a spring 42 to move a valve seat 44 into sealing engagement with a combined exhaust and delivery valve member 45 first to close an exhaust passage 46 in a sleeve member 48 and thereafter to move the valve 45 away from a delivery valve seat 50 to connect the inlet cavity 16 with the delivery cavity 24 and the service brake chambers 32, 34 to apply the brakes. As the pressure in the brake chamber builds up it operates against the piston 38 to move this upwardly against the spring 40 and the operator's foot until the combined inlet and exhaust valve 44 laps as well recognized by those skilled in the art. When the brake is to be released, the operator relaxes pedal force whereupon the spring 42 drives the piston 38 to the position of the drawing, first effecting closing of the valve 45 against the valve seat 50 and thereafter the exhaust valve seat 44 is raised clear of the valve 45 to connect the delivery cavity 24 to atmosphere by way of passage 46, an exhaust cavity 52 and a port 54 to release the brakes.

The service brake portion 12 just described is substantially identical to the brake shown in the patent to Kemble No. 3,003,825, and assigned to the same assignee as the present invention and to which reference is made for a complete description of the service valve part of the present invention.

Referring now to the spring brake control valve part 14 this includes an inlet cavity 56 which is connected by way of a conduit 58, and a parking valve 60 with an emergency reservoir 62. The parking valve 60 is of a known type whereby when the handle is in one position the emergency reservoir 62 is disconnected from the inlet cavity 56 and the latter is connected to atmosphere and in a second position the inlet cavity is disconnected from atmosphere and connected to the emergency reservoir.

At the lower end of the delivery cavity 56 is a delivery port 64 surrounded by a valve seat 66 engageable by a combined inlet and exhaust valve 68 carried at the lower end of a sleeve 70 containing an exhaust passage 71 communicating wtih the exhaust port 54 and slidably and sealingly received in a central aperture of a closure member 72 and normally urged by a spring 74 toward the valve seat 66.

The delivery port 64 leads into a delivery cavity 76 which is connected by way of a port 78 with the spring brake chamber 36 and when the valve 68 is in the open position of the drawing and the handle of the valve 60 is in a position connecting the emergency reservoir 62 with the inlet cavity 56, then reservoir pressure is delivered to the spring brake chamber 36 through the port 64 and the delivery port 78 to retain the spring brake actuator in its released position.

The combined inlet and exhaust valve 68 is normally retained in the open position of the drawing by means of a central abutment 80 carried by a piston 82 which is urged to the position of the drawing by a spring 84 received in a cavity 86 which is in open communication with the service reservoir by way of a conduit 88 and conduit 88 and conduit 20, the arrangement being such that whatever service pressure may exist in the service reservoir 22 is delivered to the pressure cavity 86 to act in concert with the spring 84 to retain the piston 82 in engagement with a stop shoulder 90 so that the abutment 80 is in its raised position of the drawing whereby a valve seat 92 at the upper end of the abutment is in sealing engagement with the combined exhaust and delivery valve 68, thereby disconnecting the delivery cavity 76 from the exhaust passage 71 in the sleeve 70. It will thus be understood that so long as there is service pressure in the reservoir 22 there is a combined force of the spring and service pressure acting upwardly on the piston 82 in opposition to a downward pressure force exerted on the upper side of the piston by the fluid pressure in the emergency reservoir 62 and also in the release chamber of the spring brake.

It will be noted that the upper end of the abutment 80 is provided with a hemispherical recess 94 and axially aligned with this recess is the rounded end of a plunger 96 rigidly and co-axially fixed to the upper graduating piston 38. The spacing between the lower end of the plunger 96 and the recess 94 in the abutment part 80 of the lower piston 82 is greater than the spacing between the service exhaust valve seat 44 and the combined service and exhaust valve 45 so that when a normal service application is made and the operator depresses the pedal 42 a normal amount to open the combined service inlet and exhaust valve 45 the plunger does not engage the recess 94 and thus, so long as there is service pressure ample to stop the vehicle, the spring brake control valve parts remain in the position of the drawing and perform no useful function. However, should the operator depress the pedal greater than what might normally be expected, so that the plunger 96 is moved into engagement with recess 94, the combined force of the service pressure and the spring 84 operating on the lower side of the piston 82 is sufficiently great that the abutment 80 serves as nothing more than a limit stop for the service valve which at this point is opened an adequate amount to effect full service braking and the operator is simply unable to depress the pedal further than the stop afforded by the recess 94.

In the event that the operator should move the pedal 42 to effect a normal service application, but the service brakes do not respond then the operator would get immediate indication that he had lost service pressure and it would then be necesary for him to effect an emergency application of the spring brake. He could do this in one fashion, as is always the case, by operating the valve 60 to connect the spring brake chamber directly to atmosphere and he would thus produce a dynamiting application of the emergency brake. On the other hand, in accordance with the invention he could elect to not operate the valve 60 but instead he could depress the pedal 42 a greater amount until the end of the plunger 96 engages the recess 94 and, because the piston 82 is not now being opposed by the combined effort of service reservoir pressure and spring force, but has only the latter acting against it, the operator is able to move the piston 82 downwardly against the upward force of the spring 84 until the lower combined inlet and exhaust valve 68 engages the seat 66, thus disconnecting the emergency reservoir from the spring brake chamber and, upon further movement, the valve seat 92 at the upper end of the abutment 80 is moved out of engagement with the combined inlet and exhaust valve 68 so that the pressure in the spring brake chamber can now escape to atmosphere through the port 64, the passage 71 in the sleeve 70, the exhaust chamber 52 and exhaust port 54 to atmosphere.

As the pressure in the release chamber falls, the downward pressure force on the piston 82 is relieved so that the spring 84 moves the piston and hence valve seat 92 upwardly against spring 40 to lap the valve element 68 to effect partial application of the spring brake and consequent gradual slowdown of the vehicle which the operator can increase at will by further depression of the pedal and the vehicle is thus brought to a stop very nearly identically to the manner in which it would be stopped with a normal service application. Obviously if the vehicle is decelerating too rapidly the operator can decrease the rate of deceleration by letting up on the pedal to admit more pressure to the release cavity provided, of course, emergency pressure is still available.

Figure 2:
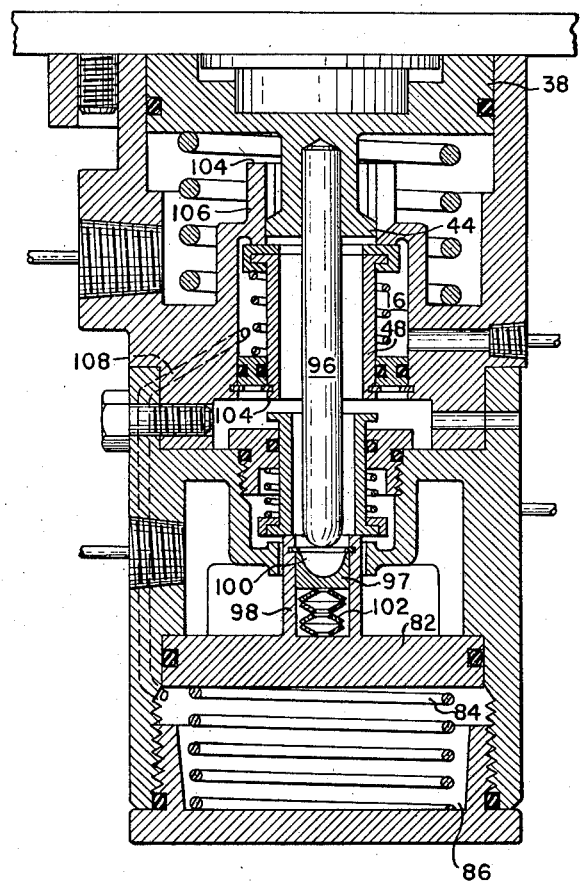
FIG. 2 is a vertical cross-sectional view of a modification of the valve of FIG. 1.

The valve of the embodiment of FIG. 2 is substantially identical to the valve of FIG. 1 and like reference characters designate like parts throughout. The prime distinction between the valves of FIG. 1 and FIG. 2 is that the latter, instead of having a fixed abutment 80 engageable by the plunger 96, the piston 82 is provided with an abutment 97 which is slidable with respect to the piston 82 within a hollow neck 98 integral with the upper side of the piston 82 and, except for the hollow interior, dimensionally and functionally similar to the abutment 80 of FIG. 1. The interior of the hollow neck 98 adjacent its upper end is grooved to receive a snap ring 100 against which the upper edge of the abutment 97 is at all times urged by spring means, such as the Belleville springs 102 disposed between the bottom of the hollow neck and the underside of the abutment.

In accordance with the invention, the sliding abutment arrangement is provided to prevent any possibility of applying the spring brake to compound a normal service brake application. This is accomplished by selecting the springs 102 so that they are sufficiently pre-loaded as to yield relative to the spring 84 when service reservoir pressure operates on the piston 82 and the plunger 96 is inadvertently moved down into engagement with the recess 94. On the other hand, when there is loss of pressure from the underside of the piston 82, the loading on the springs 102 is such that they will not collapse relative to spring 84 and will perform almost identically as would a rigid member between the plunger 96 and the bottom of the hollow neck 98 so that the spring brakes may be applied as described in connection with FIG. 1. It will be noted that the ability of the springs to collapse should be sufficient so that they do not become solid before the piston 38 engages the upper edge 104 of the slotted neck part 106 which serves as a guide for the valve seat 44. Thus, accidental application of the spring brakes is positively prevented whenever normal service reservoir pressure is applied to the underside of the piston 82.

FIG. 2 also illustrates an alternative means for connecting the cavity 86 beneath the piston 82 to the source of service pressure. As can be seen, a drilled passage 108 may be provided within the body of the valve unit to connect the cavity 86 with the service pressure inlet cavity 16.

From the foregoing description, it should be apparent that the present invention effectively provides a combined service and spring brake control valve which is operable under the control of the operator to produce a controlled graduated spring brake application upon loss of service pressure. Those skilled in the art will recognize that the invention is susceptible of a variety of changes and modifications without, however, departing from the scope and spirit of the invention.

What is claimed is:

1. A valve assembly for controlling fluid pressure applied brakes and spring applied, fluid pressure released brakes comprising a housing containing a self-lapping brake valve including inlet, delivery and exhaust ports adapted to be connected respectively to a source of service fluid pressure, a brake chamber and atmosphere, a valve element for controlling said ports and a pedal carried by said housing and operatively connected to said element to actuate the same to connect and disconnect said ports to apply and release said fluid pressure applied brakes within a first range of movement of said pedal, a second valve in said housing having second inlet, delivery and exhaust ports adapted to be connected respectively to a source of emergency fluid pressure, a spring brake and atmosphere, a valve element for controlling said ports, actuator means normally retaining said valve element in a position connecting said inlet and delivery ports while disconnecting the latter from said exhaust port, opposed motive areas on said actuator means exposed respectively to the pressure at said second delivery port and the pressure at said first inlet port, resilient means acting on said actuator means in opposition to the pressure at said second delivery port and in concert with the pressure at said first inlet port, and means responsive to predetermined movement of said pedal greater than its first range of movement for moving said actuator means upon failure of pressure at said first inlet port and operating said second valve element to disconnect said second inlet and delivery ports while metering the fluid pressure at said delivery port to atmosphere through said second exhaust port.

2. The assembly of claim 1 wherein said second valve element is carried in axial tandem relationship with said first valve element and the means responsive to movement of said pedal comprises plunger means, said actuator means including an abutment in spaced axial alignment with said plunger, the spacing of said abutment from said plunger being greater than the distance said plunger is moved when said pedal is operated within its first range of movement.

3. The assembly of claim 2 wherein the actuator means comprises a piston member, a cavity on the side of said piston member opposite the side thereof subjected to the pressure at said second delivery port, said resilient means comprising a spring in said cavity acting against said piston in opposition to the second delivery pressure acting on said piston, said cavity being connected to said first inlet port with the pressure thereof acting in concert with the force of said spring to provide stop means for said plunger to prevent unlimited operation of said second valve element to release said spring brakes so long as the pressure at the first inlet port is above a predetermined safe value.

4. The assembly of claim 3 including second yieldable spring means interposed between said abutment and said piston, said spring means being constructed and arranged to yield and permit relative movement between said piston and the abutment upon engagement thereof by said plunger so long as said piston is subjected to the combined opposing forces of the first mentioned spring and the normal pressure at said first inlet port, said abutment spring means having a yield strength greater than that of the opposing spring engaging said piston so that upon failure of the fluid pressure acting in concert with said first spring on said piston, the abutment spring means does not yield and the piston is movable by said plunger through said second spring means against the opposing force of said first spring.

References Cited

UNITED STATES PATENTS 3,188,916   6/1965   Beatty.
3,309,149   3/1967   Bueler _____ 303—13

MILTON BUCHLER, Primary Examiner

J. J. McLAUGHLIN, JR., Assistant Examiner

U.S. Cl. X.R.

137—116, 596.2, 627.5; 303—9, 52, 68